(12) United States Patent
Lamm (10) Patent No.: US 7,390,030 B2
(45) Date of Patent: Jun. 24, 2008

(54) PIPE JOINT INCLUDING IMPROVED LOCKING MECHANISM

(75) Inventor: Brian E. Lamm, Toccoa, GA (US)

(73) Assignee: Eaton Corporation, Cleveland, OH (US)

( * ) Notice: Subject to any disclaimer, the term of this patent is extended or adjusted under 35 U.S.C. 154(b) by 231 days.

(21) Appl. No.: 11/092,272

(22) Filed: Mar. 29, 2005

(65) Prior Publication Data

US 2005/0218651 A1   Oct. 6, 2005

Related U.S. Application Data

(60) Provisional application No. 60/557,615, filed on Mar. 30, 2004.

(51) Int. Cl.
*F16L 37/00* (2006.01)

(52) U.S. Cl. .......................... 285/321; 285/314; 285/316

(58) Field of Classification Search ................. 285/321, 285/314, 308, 374, 403, 316
See application file for complete search history.

(56) References Cited

U.S. PATENT DOCUMENTS

| | | | |
|---|---|---|---|
| 2,727,761 A | | 12/1955 | Elliott et al. |
| 5,492,371 A | * | 2/1996 | Szabo .......................... 285/23 |
| 5,553,895 A | * | 9/1996 | Karl et al. ...................... 285/39 |
| 6,390,513 B1 | | 5/2002 | Kaneko |
| 6,450,545 B1 | * | 9/2002 | LeMay et al. .................. 285/93 |
| 6,604,760 B2 | * | 8/2003 | Cresswell et al. ............ 285/305 |
| 7,029,035 B2 | * | 4/2006 | Seymour et al. ............. 285/308 |
| 2002/0113431 A1 | | 8/2002 | LeMay et al. |

FOREIGN PATENT DOCUMENTS

| | | |
|---|---|---|
| EP | 717226 | 6/1996 |
| FR | 2554543 | 10/1985 |
| GB | 2235741 | 3/1991 |

* cited by examiner

*Primary Examiner*—David E Bochna
(74) *Attorney, Agent, or Firm*—Benesch, Friedlander, Coplan & Aronoff LLP (57) ABSTRACT

A pipe joint is provided that includes a first length of pipe having a first flange and a second length of pipe having a second flange. The first flange includes a ramp extending outwardly and away from a leading exterior surface and a first locking surface extending inwardly and away from the ramp. The second flange includes an interior portion sized to receive the first flange. The interior portion includes a second locking surface and an inwardly facing annular groove adapted to receive a resiliently expandable locking member. The second locking surface is positioned within the interior portion such that, upon insertion of the first flange into the second flange, the resiliently expandable locking member expands as it travels up the ramp and then contracts to become positioned between the first locking surface and the second locking surface to prevent withdrawal of the first flange from the second flange.

16 Claims, 12 Drawing Sheets

PIPE JOINT INCLUDING IMPROVED LOCKING MECHANISM

CROSS-REFERENCE TO RELATED APPLICATIONS

This application claims priority to U.S. provisional application 60/557,615 filed on Mar. 30, 2004, which is incorporated herein by reference in its entirety.

BACKGROUND

The present invention relates generally to a pipe joint used to connect a first length of pipe to a second length of pipe.

The use of pipe is well known for transporting many types of fluids and finely divided solids. Since it is impractical to manufacture pipe specific to each use, pipe is often produced in common lengths and diameters. Typically, a junction is required between two pieces of pipe and is known as a pipe joint. Some pipe joints may be exposed to relatively high pressures in their use and, therefore, include tool-operated locking mechanisms, such as nut and bolt combinations, bolt and threaded flange combinations, or threaded male and female tubular members, which are robust enough to handle the internal pressure load. Pipe joints found in compact, difficult to see, and/or hard to reach areas, are rendered difficult or impossible to assemble with tool-operated locking mechanisms. For at least this reason, new pipe joint configurations are desired that improve the connectability of pipe.

SUMMARY OF THE INVENTION

A pipe joint is provided that includes a first length of pipe having a first flange and a second length of pipe having a second flange. In an embodiment, the first flange includes a ramp extending outwardly and away from a leading exterior surface and a first locking surface extending inwardly and away from the ramp. The second flange includes an interior portion sized to receive the first flange. The interior portion includes a second locking surface and an inwardly facing annular groove adapted to receive a resiliently expandable locking member. The second locking surface is positioned within the interior portion such that, upon insertion of the first flange into the second flange, the resilient locking member expands as it travels up the ramp and then contracts to become positioned between the first locking surface and the second locking surface to prevent withdrawal of the first flange from the second flange.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Referring now to the drawings, several embodiments of the present invention are shown in detail. Although the drawings represent some embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 1:
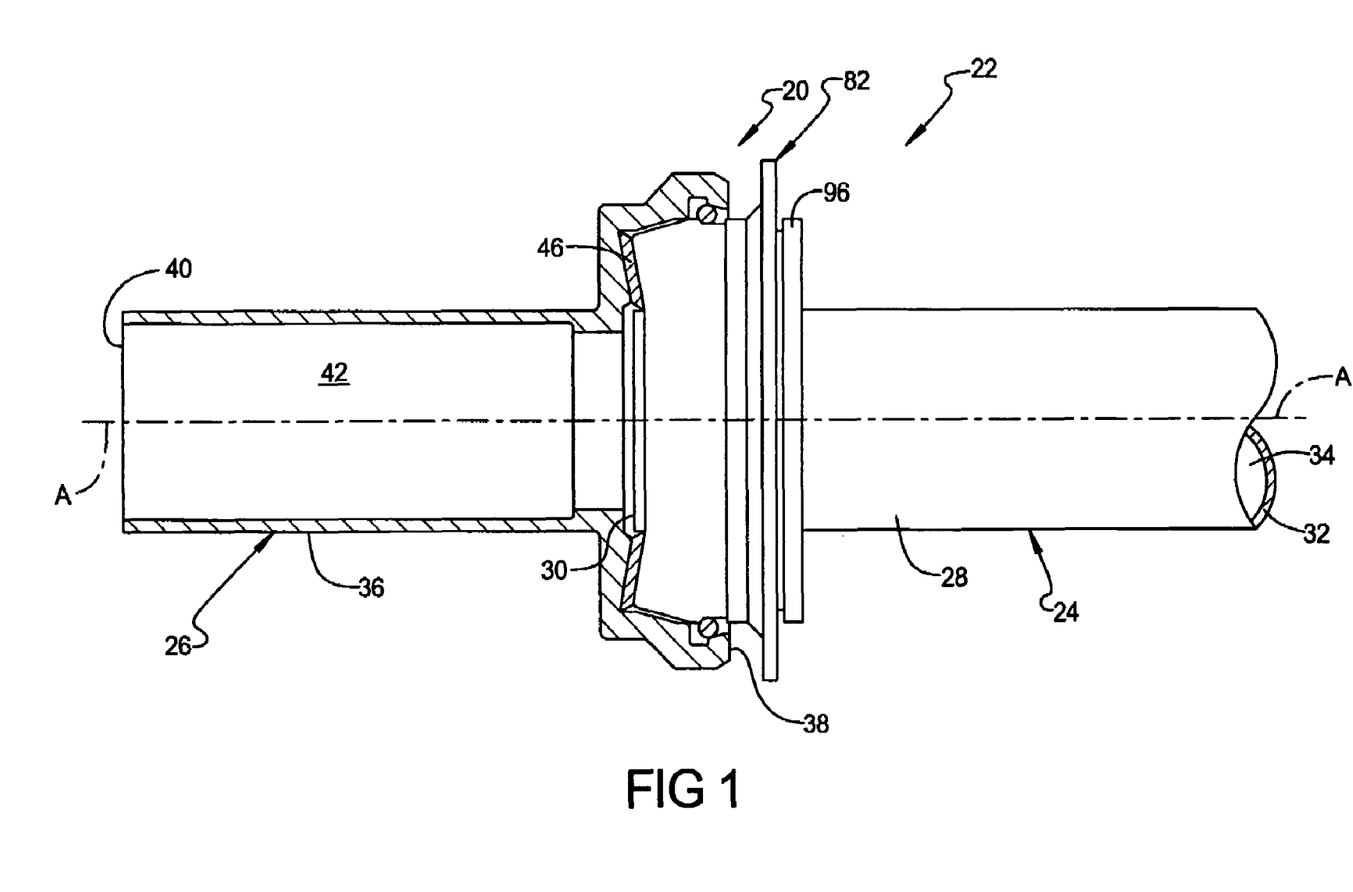
FIG. 1 is a partial cross-sectional view of a tubular assembly including a pipe joint according to an embodiment of the present invention.

FIG. 1 illustrates a pipe joint 20 according to an embodiment of the invention that is suitable for use in a tubular assembly 22. In the illustrated embodiment, pipe joint 20 includes a first or male tubular member 24 and a second or female tubular member 26. First tubular member 24 and second tubular member 26 generally extend along an axis A-A when first tubular member 24 is coupled to second tubular member 26.

Figure 2:
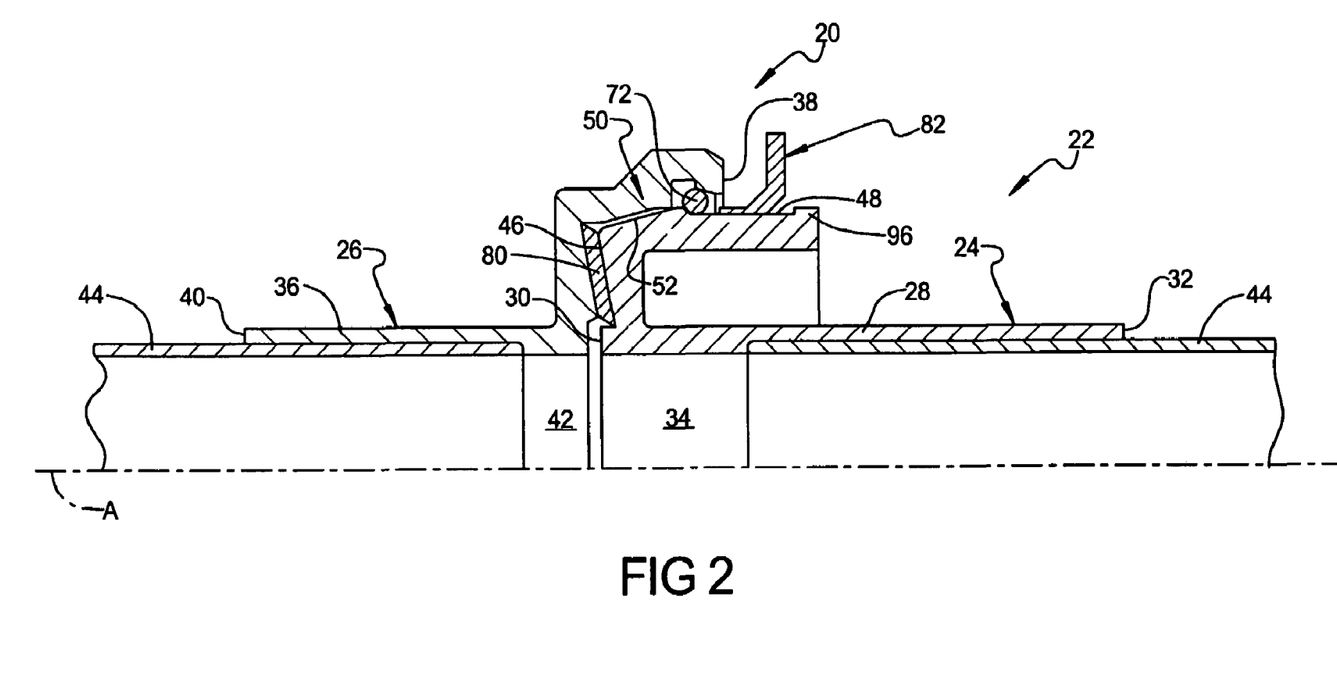
FIG. 2 is a cross-sectional view of a pipe joint according to an embodiment of the present invention.

In the embodiment shown in FIGS. 1 and 2, first tubular member 24 includes a first flange 28 that extends from a forward end 30 toward a rearward end 32 and has a first passageway 34 extending therethrough. First flange 28 is adapted for insertion into a second flange 36 of second tubular member 26. Second flange 36 extends from a leading end 38, having a receiving portion adapted to receive forward end 30 of first flange 28, toward a remote end 40 and has a second passageway 42 extending therethrough.

Each of first and second flanges 28, 36 may be adapted to receive a length of pipe 44, as shown in FIG. 2, which may be secured together using a number of techniques, including without limitation, welding, brazing, adhering and the like. Alternatively, first and second flanges 28, 36 may be integrally formed with a length of pipe 44 using a variety of techniques, including, for example, compression molding and the like. Pipe 44 may include, without limitation, metal and polymeric tubing, such as steel pipe or PVC pipe, and generally tubular structures and conduits for transporting various media such as fluids and finely divided solids.

Figure 2A:
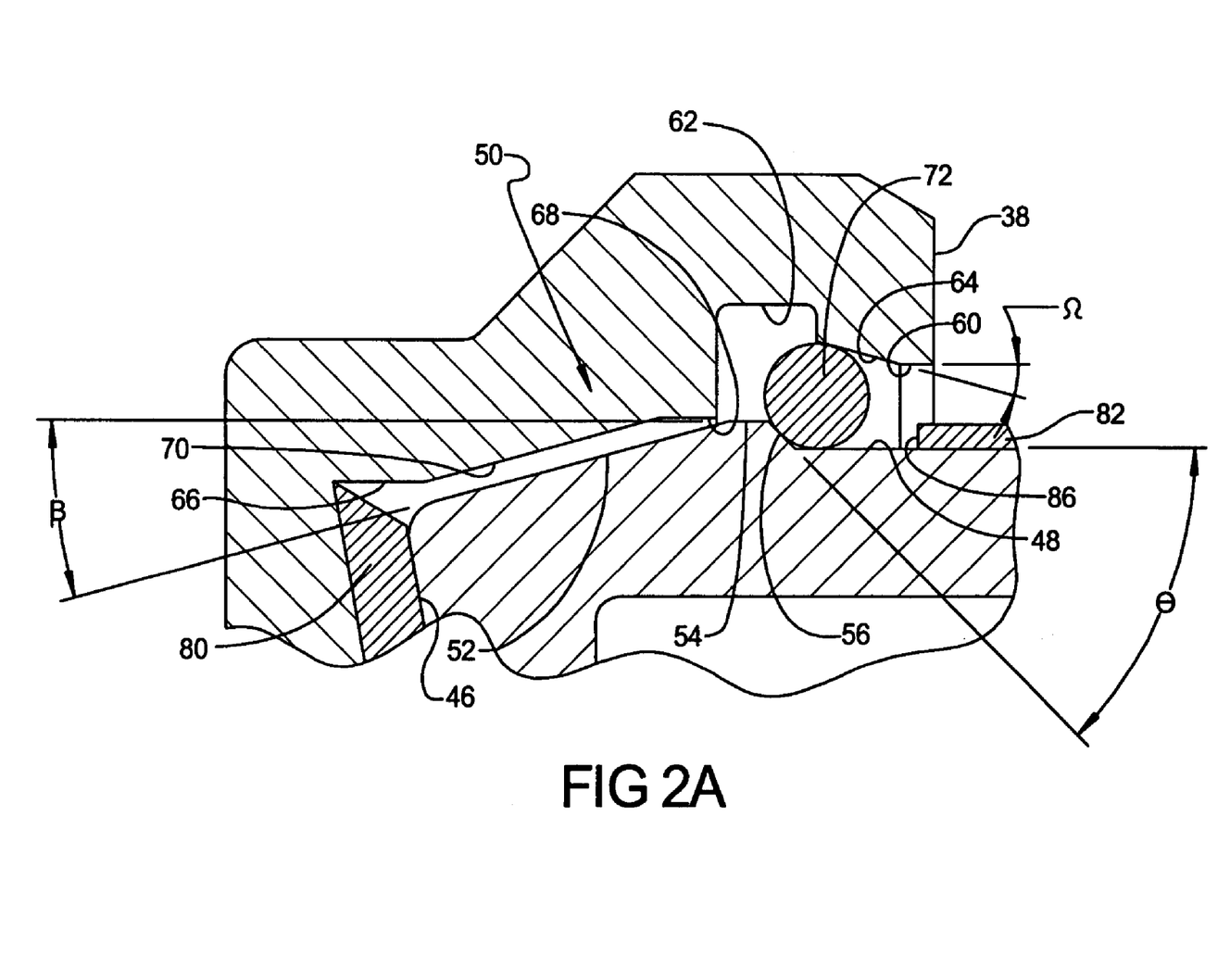
FIG. 2A is a detailed view of the pipe joint of FIG. 2 shown in a connected state.

Referring to FIGS. 2 and 2A, first flange 28 includes a leading exterior surface 46 and a generally cylindrical exterior surface 48 that is separated from leading exterior surface 46 by a rib 50. In an embodiment, rib 50 includes a tapered ramp 52 that extends generally outwardly and away from leading exterior surface 46. Ramp 52 terminates at an apex 54, which may include, without limitation, a generally cylindrical surface that is essentially parallel to axis A-A or alternatively a point. In an embodiment, ramp 52 extends at an angle β, which, for example, may be in the range of about 10° to 25° relative to apex 54 and/or axis A-A.

Rib 50 also includes a first locking surface 56 that tapers rearwardly and inwardly from apex 54 to meet exterior surface 48. In the illustrated embodiment, first locking surface 56 tapers at an angle Θ in the range of about 35° to 55° relative to cylindrical exterior surface 48 and/or axis A-A, such as at an angle of about 45°, although angle Θ is not intended to be limited thereto. The configuration of rib 50 shown in FIGS. 2 and 2A is given by way of example only and is not intended to be limit the scope of the invention. For example, ramp 52 and/or first locking surface 56 may exhibit a non-linear profile instead of the generally linear profile shown in the drawings.

Referring still to FIGS. 2 and 2A, second flange 36 includes a first inwardly facing and generally cylindrical wall 60 adjacent leading end 38 and an inwardly facing annular groove 62 that extends outwardly from first inwardly facing cylindrical wall 60. A second locking surface 64 is disposed between annular groove 62 and inwardly facing cylindrical wall 60. In the illustrated embodiment, second locking surface 64 extends outwardly and away from inwardly facing cylindrical wall 60 at an angle Ω of about 10° to 30° relative to inwardly facing cylindrical wall 60 and/or axis A-A, such as at an angle of about 20°, although angle Ω is not intended to be limited thereto. Like first locking surface 56, the second locking surface 64 configuration shown in the drawings is given by way of example only and is not intended to be limit the scope of the invention. For example, second locking surface 64 may exhibit a non-linear profile instead of the generally linear profile shown in the drawings or may be configured as a combination of linear and non-linear surface portions that form a pocket or groove.

Figure 2B:
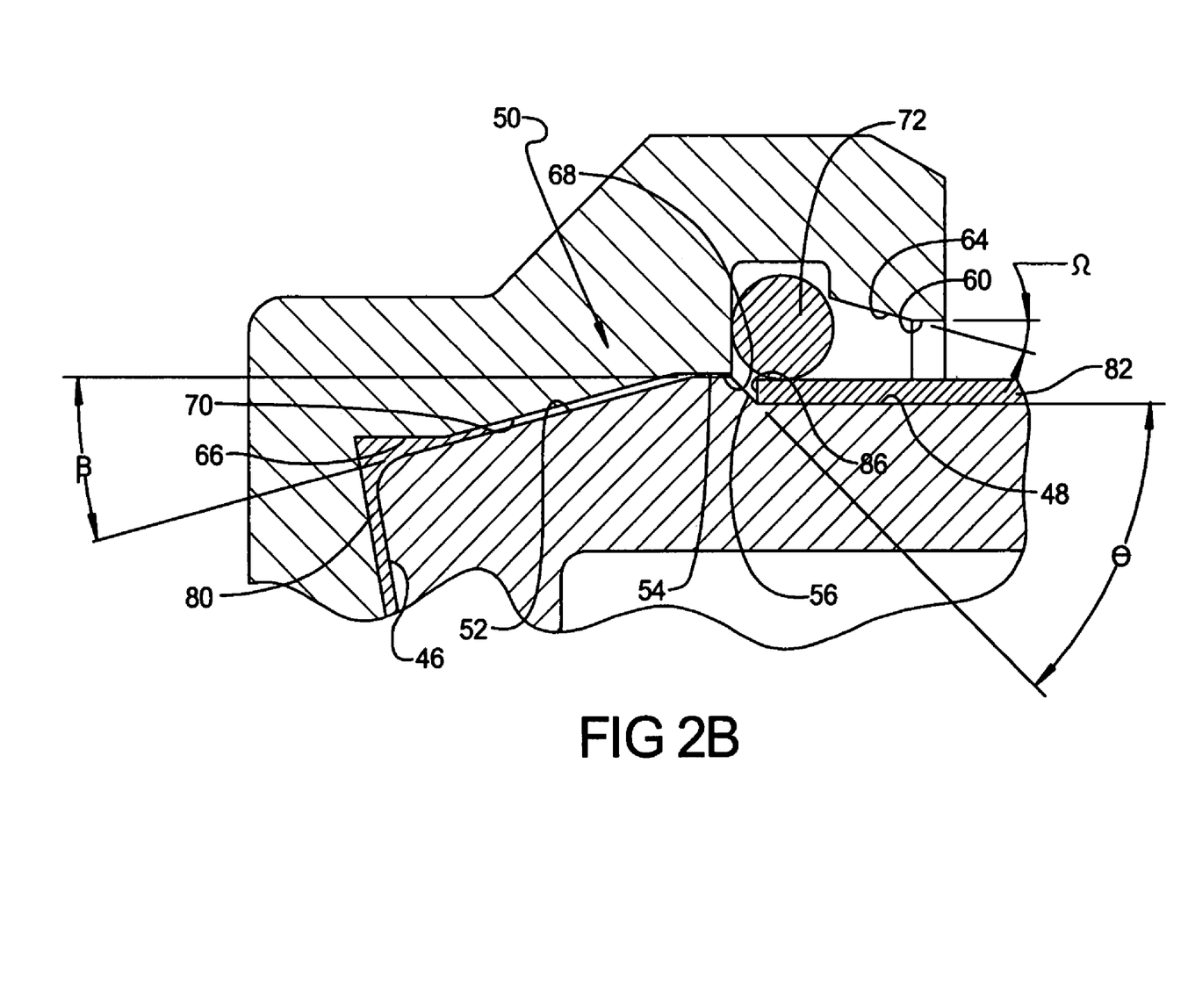
FIG. 2B is a detailed view of the pipe joint of FIG. 2 shown during disconnection.

In an embodiment, second flange 36 also includes a second inwardly facing cylindrical wall 66 and a third inwardly facing cylindrical wall 68 positioned toward remote end 40 relative to annular groove 62. An intermediate wall portion 70 is disposed between second and third inwardly facing cylindrical walls 66, 68. Second inwardly facing cylindrical wall 66, intermediate wall portion 70 and third inwardly facing cylindrical wall 68 are sized to receive ramp 50 and apex 54 to permit some degree of axial movement of first flange 28 relative second flange 36 as shown in FIG. 2B.

Figure 3:
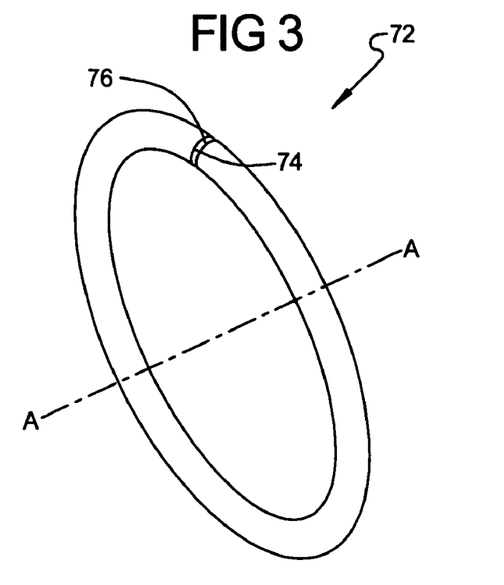
FIG. 3 is a perspective view of a locking member according to an embodiment of the present invention.

Retained within the receiving portion of second flange 36 is a resiliently expandable locking member 72, such as a split locking ring or garter spring, which may be formed of, among other materials, a spring tempered phosphoric bronze, a spring tempered stainless steel, or a polymer, such as plastic. In the embodiment shown in FIG. 3, for example, locking member 72 is a split locking ring that includes a first end 74 and second end 76, which may be in abutting relationship or have a slight gap therebetween.

In an embodiment, locking member 72 has an internal diameter substantially equal to or slightly smaller than that of cylindrical exterior surface 48 on first flange 28 to snugly engage exterior surface 48 when first flange 28 is connected to second flange 36. The internal diameter of locking member 72 is, therefore, smaller than the diameter of apex 54. Locking member 72, by virtue of its dimensions, will be retained in annular groove 62 when first flange 28 is disconnected from second flange 36.

Upon insertion of first flange 28 into second flange 36, leading exterior surface 46 will pass through locking member 72 until ramp 52 reaches locking member 72. Continued inward movement of first flange 28 will cause ramp 52 to expand locking member 72, which in the embodiment of locking member 72 illustrated in FIG. 3, opens up the gap between first end 74 and second end 76 by increasing amounts as locking member moves up ramp 52. As locking member 72 moves over apex 54 upon continued axial movement of first flange 28 into second flange 36, locking member 72 will contract to a size approaching its original size and, in doing so, will be positioned to prevent withdrawal of first flange 28 from second flange 36 by virtue of locking member 72 being positioned between first and second locking surfaces 56, 64.

As will be appreciated from viewing FIG. 2A, first locking surface 56 and second locking surface 64 may be disposed at converging angles in the direction toward annular groove 62 to inhibit movement of locking member 72 into annular groove 62 when first and second flanges 28, 36 are connected and subjected to an axial separating force due to pressurized fluid within tubular assembly 22. This convergence results from the fact that angle Θ of first locking surface 52 is greater than angle Ω of second locking surface 74 in relation to axis A-A, or vice versa. However, joint 20 is not intended to be limited to those configurations in which first and second locking surfaces 56, 64 converge.

To inhibit fluid leakage from joint 20 when first and second flanges 28, 36 are connected, second flange 36 may include a sealing member 80. In the embodiment shown in FIGS. 2-2B, leading exterior surface 46 of first flange 28 sealingly engages sealing member 80 by axially compressing sealing member 80 against second flange 36. During connection of first and second flanges 28 and 36, the force required to push first flange 28 into second flange 36 increases as sealing member 80 is compressed. Therefore, a readily compressible sealing member that facilitates a low push-in force is ideal for aiding in the connection of flanges 28, 36, although not required. Sealing member 80 may be made from a polymeric and/or metallic material and may be secured to first flange 28 or second flange 36 is desired.

Figure 4:
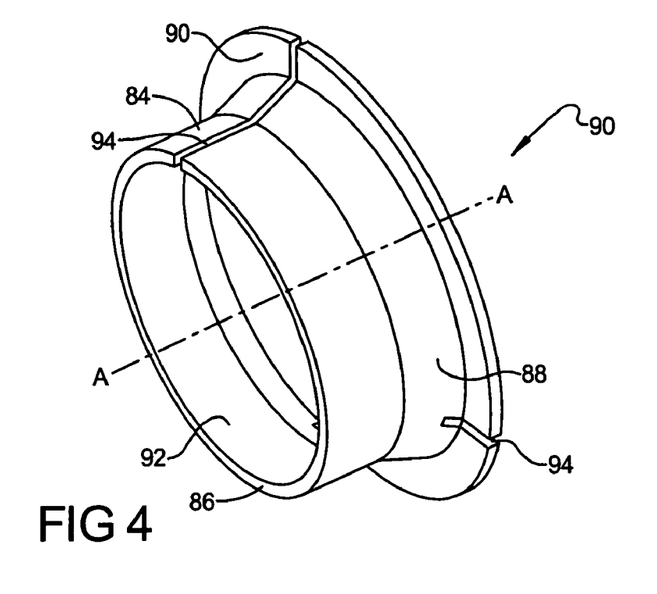
FIG. 4 is a perspective view of a release member according to an embodiment of the present invention.

Referring to FIGS. 2-2B and 4, first flange 28 may also include an axially moveable release member portion 82. In an embodiment, release member 82 includes a split, generally cylindrical wall 84 that extends from a leading edge 86 to an optional tapered wall portion 88, and a flange 90 that extends radially outward from tapered wall portion 88. A single slot or split 92 extends through release member 82 from leading edge 86 through cylindrical wall portion 84, tapered wall portion 88 and flange 90. Slot 92 permits release member 82 to expand as it is assembled onto first flange 28 and as it is moved to a release position shown in FIG. 2B. The presence of slots 94 prevents a build up of stress in flange 90 and tapered wall portion 88 as release member 82 expands. When release member 82 is movably retained on first flange 28, trailing cylindrical surface 48 may include a radially outwardly extending stop 96 (FIG. 2) to inhibit removal of release member 82 from first flange 28.

Referring to FIG. 2B, when it is desired to disconnect first flange 28 from second flange 36, first flange 28 is moved axially further into second flange 36 and release member 82 is moved axially toward first locking surface 56 on first flange 28 such that leading edge 86 of release member 82 engages locking member 72. As release member 82 continues to move forward, leading edge 86 forces locking member 72 to engage and move-up first locking surface 56 and/or expand over apex 54 and into annular groove 62 of second flange 36. Once locking member 72 has been removed from its locking position between first locking surface 56 and second locking surface 64, first flange 28 is disconnected from second flange 36 and first tubular member 24 can be separated from second tubular member 26.

Figure 5:
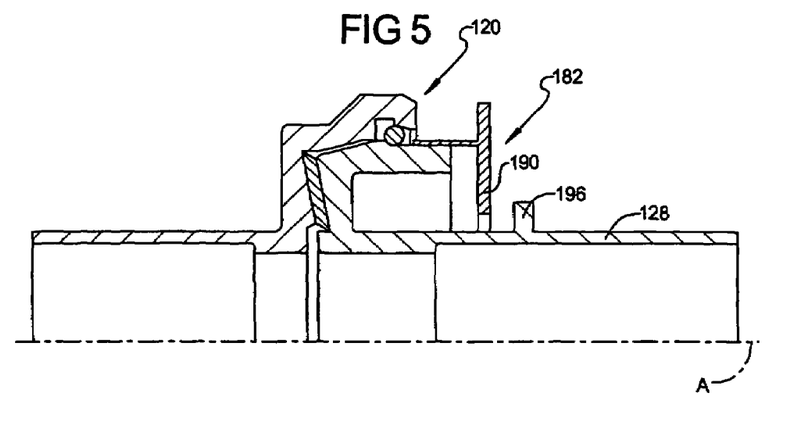
FIG. 5 is a cross-sectional view of a pipe joint according to another embodiment of the present invention.

Referring to FIG. 5, a pipe joint 120 according to another embodiment of the present invention is shown. This embodiment is substantially similar to the embodiment illustrated in FIG. 2, except that flange 190 of a release member 182 includes a radially inwardly extending portion that extends toward first flange 128 in addition to or in lieu of the radially outwardly extending portion shown in FIGS. 4 and 5. When release member 182 is movably retained on first flange 128, first flange 128 may include a radially outwardly extending stop 196 to inhibit removal of release member 182 from first flange 128.

Figure 6:
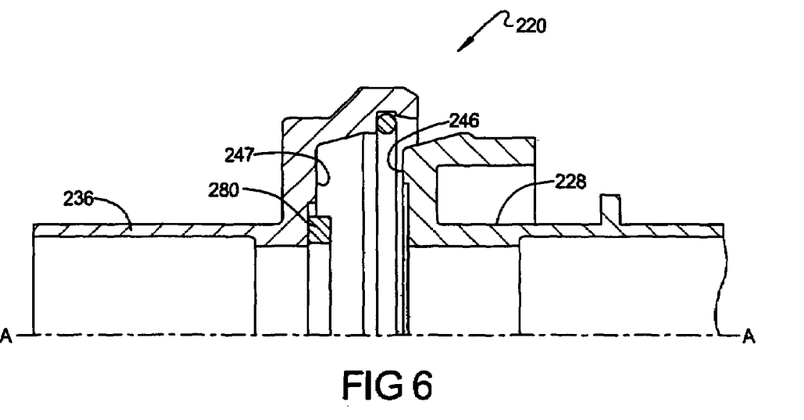
FIG. 6 is a cross-sectional view of a pipe joint according to another embodiment of the present invention.

Referring to FIG. 6, a pipe joint 220 according to another embodiment of the present invention is shown. In the illustrated embodiment, a leading exterior surface 246 of first flange 228 is generally perpendicular to axis A-A and a receiving interior surface 247 of second flange 236 is also generally perpendicular to axis A-A. When so configured, a generally rectangular annular seal 280, such as a seal conforming to the AS-1895 standard, may be received in second flange 236 and sealingly engaged by first flange 228 when first and second flanges 228, 236 are connected. Depending on the thickness of seal 280, leading exterior surface 246 and/or receiving interior surface 247 may include a recess or groove (as shown in FIG. 6) to accommodate seal 280 without excessive compression.

Figure 7:
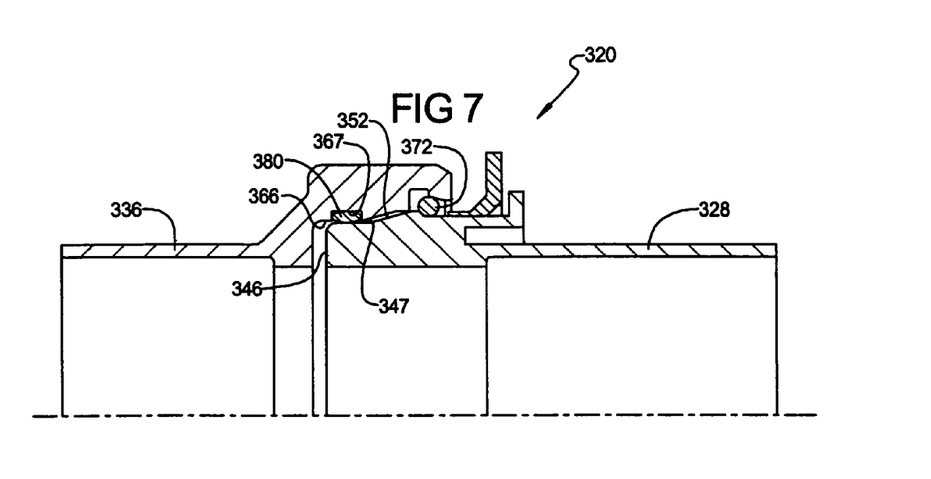
FIG. 7 is a cross-sectional view of a pipe joint according to another embodiment of the present invention.
Figure 8:
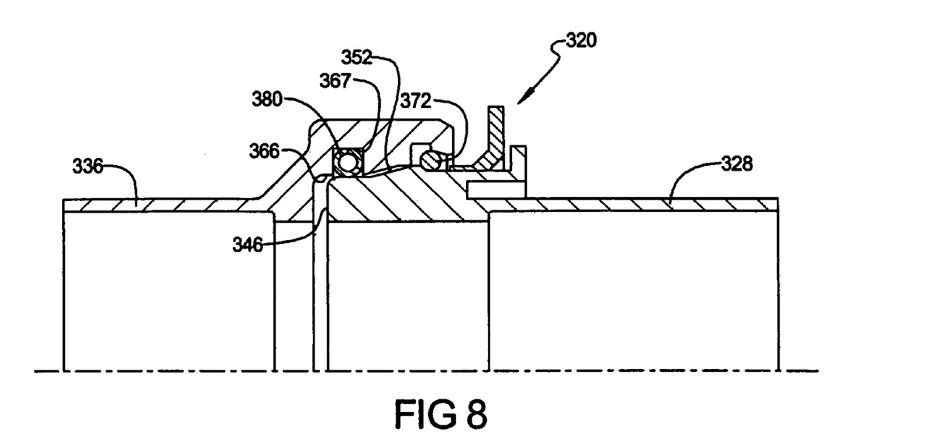
FIG. 8 is a cross-sectional view of a pipe joint according to another embodiment of the present invention.

Referring to FIGS. 7 and 8, a pipe joint 320 according to another embodiment of the present invention is shown. In this embodiment, a second inwardly facing cylindrical wall 366 of a second flange 336 includes an inwardly facing annular groove 367 in which is positioned an annular seal 380. To facilitate sealing engagement with first flange 328, first flange 328 includes an exterior cylindrical surface 347 that extends generally parallel to second inwardly facing cylindrical wall 366 between a leading exterior surface 346 and a ramp 352. Annular seal 380 may be an "O-ring" (see, e.g., FIG. 7), a "C-ring" (see, e.g., FIG. 8), for example, and may be fabricated from rubber, plastic, metal or other resiliently flexible material. Upon insertion of first flange 328 into second flange 336, exterior cylindrical surface 347 passes through locking member 372 and, upon connection of first and second flanges 328, 336, radially and sealingly engages annular seal 380.

Figure 9:
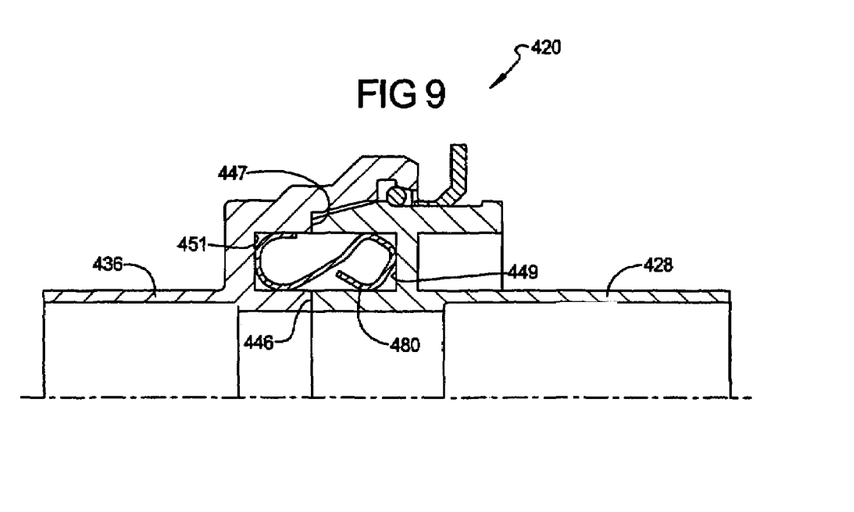
FIG. 9 is a cross-sectional view of a pipe joint according to another embodiment of the present invention.

Referring to FIG. 9, a pipe joint 420 according to another embodiment of the present invention is shown. In this embodiment, a leading exterior surface 446 of a first flange 428 includes a first cavity 449 and a receiving interior surface 447 of a second flange 436 includes a second cavity 451. A resilient "S-seal" style sealing member 480 is received in first and second cavities 449, 451. When first flange 428 is connected to second flange 436, sealing member 480 is sealingly engaged to first and second flanges 428, 436 within first and second cavities 449, 451, respectively, creating an axial and/or radial seal to prevent fluid leakage from pipe joint 420.

Figure 10:
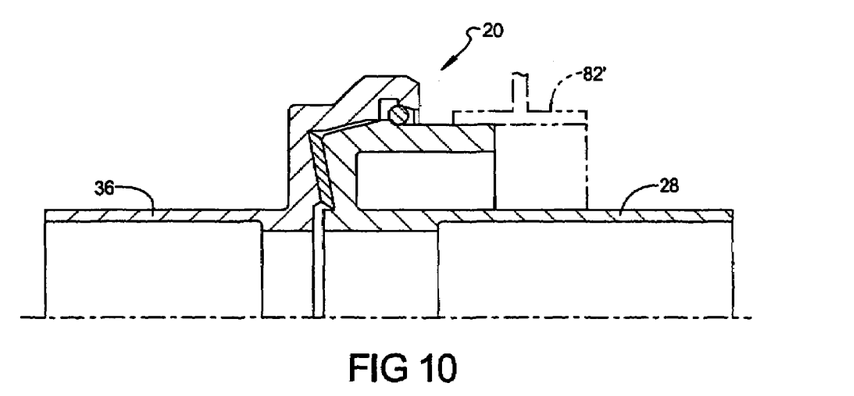
FIG. 10 is a cross-sectional view of a pipe joint according to another embodiment of the present invention.

Referring to FIG. 10, a pipe joint 20 according to another embodiment of the present invention is shown. The embodiment illustrated in FIG. 10 is substantially similar to the embodiment shown in FIGS. 1 and 2 with at least one exception, namely, pipe joint 20 does not include a release member 82. When so configured, first flange 28 cannot be disconnected from second flange 36 without the use of a separate release member 82' (shown in phantom in FIG. 10), which may be similar to release member 82 in form and function, but removably secured to first flange 528. This embodiment may be applied in installations where a readily connectable and relatively permanent pipe joint connection is desired. However, if disconnection of first and second flanges 28, 36 is desired, release member 82' may be employed to separate the tubular members as described above.

Figure 11:
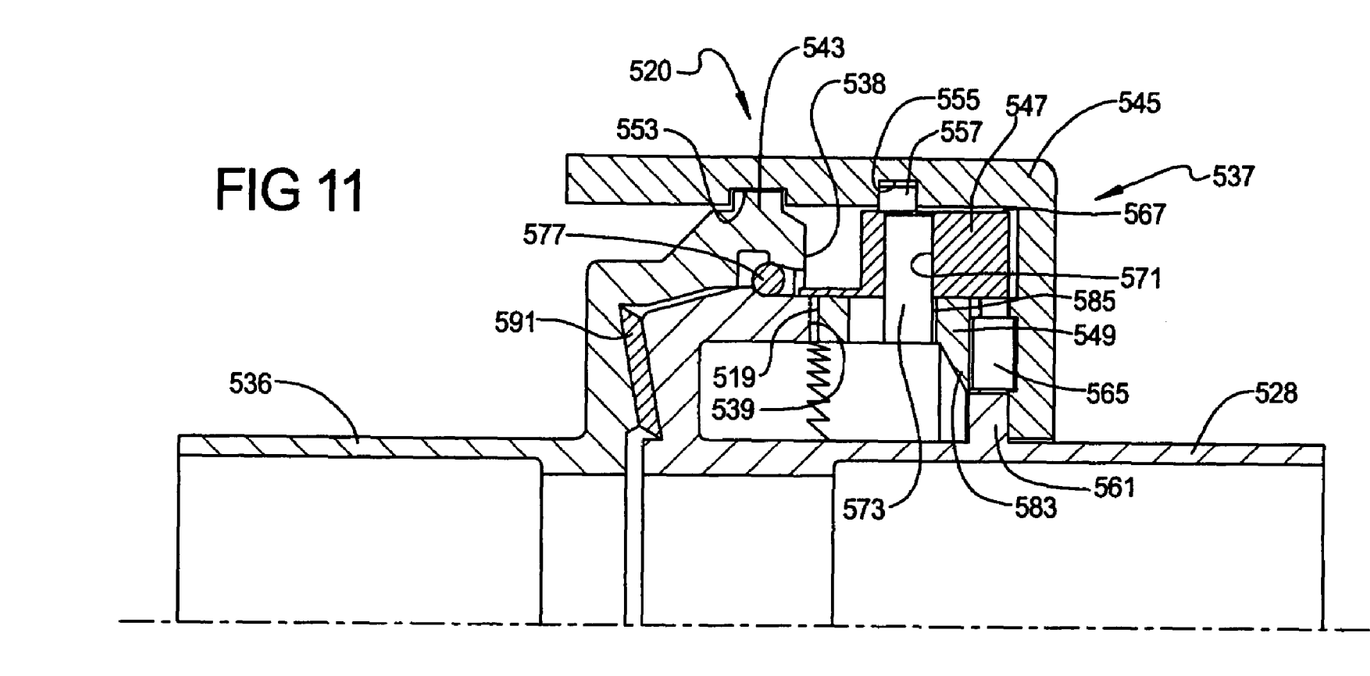
FIG. 11 is a cross-sectional view of a pipe joint according to another embodiment of the present invention.

Referring to FIG. 11, a pipe joint 520 according to another embodiment of the present invention is shown. In the illustrated embodiment, pipe joint 520 includes a first flange 528, second flange 536 and a release assembly 537. First flange 528 is substantially similar to first flange 28 described above except that stop 96 is removed and cylindrical exterior surface 48 includes a serrated cam edge 539. Second flange 536 is substantially similar to second flange 36 described above except for the inclusion of a number of radially outwardly extending tabs 543 located proximate a leading end 538.

In an embodiment, release assembly 537 includes a generally cylindrical sleeve 545, a generally annular release member 547, and a generally annular ratchet ring 549. As shown in FIGS. 12-16, sleeve 545 includes a first inner cylindrical surface 551 having a number of sleeve grooves 553 (FIG. 15) for receiving tabs 543 on second flange 536. Sleeve 545 also includes a number of first holes 555 within which a first generally cylindrical pin 557 (FIG. 11) is received to movably connect sleeve 545 to release member 547.

Figure 12:
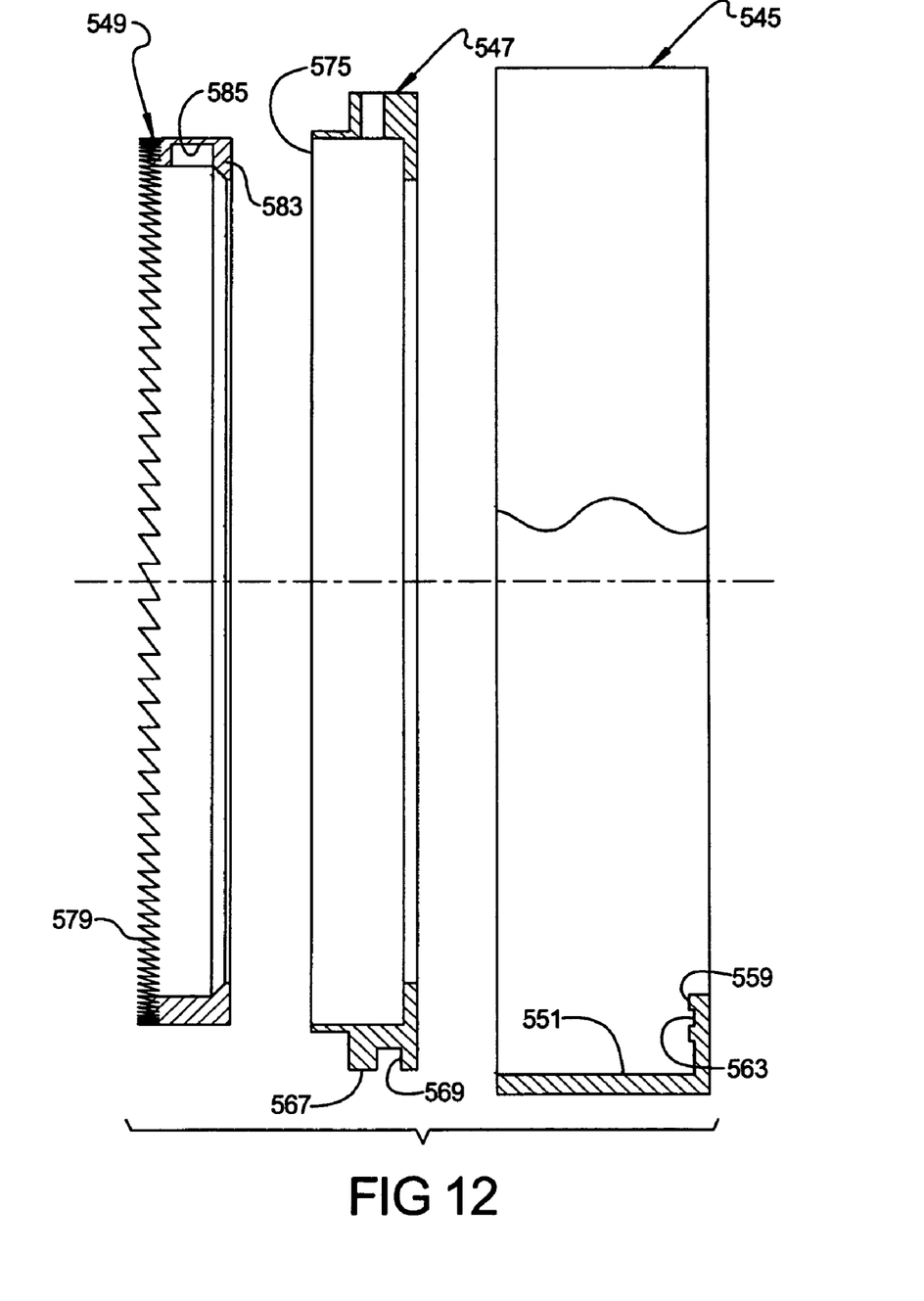
FIG. 12 is an exploded view of a release assembly according to an embodiment of the present invention, for use with the pipe joint of FIG. 11.
Figure 13:
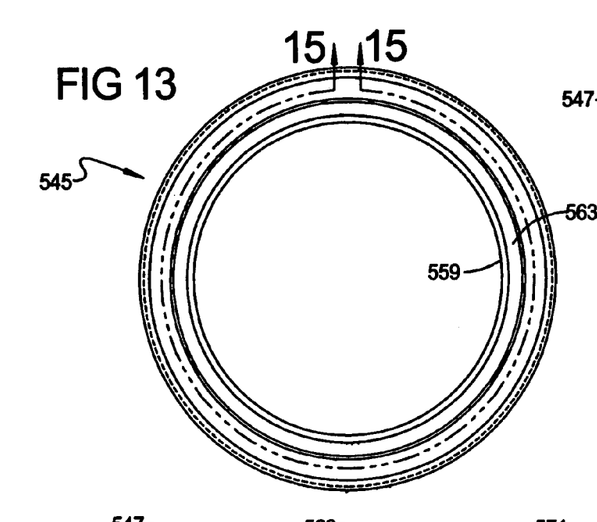
FIG. 13 is an end elevation view of a sleeve for use in the release assembly of FIG. 12.

Referring specifically to FIGS. 11 and 12, sleeve 545 also includes an inner wall 559 that abuts a cylindrical stop 561 on first flange 528 when release assembly 537 is in a fully locked position (see, e.g., FIG. 11). Inner wall 559 of sleeve 545 may include an annular trough 563 sized to receive a resilient biasing member 565, such as a wave spring and the like.

Figure 14:
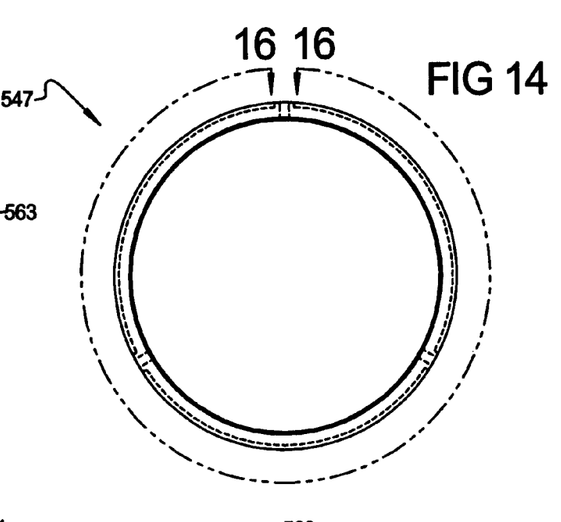
FIG. 14 is an end elevation view of a release member for use in the release assembly of FIG. 12.
Figures 15, 16:
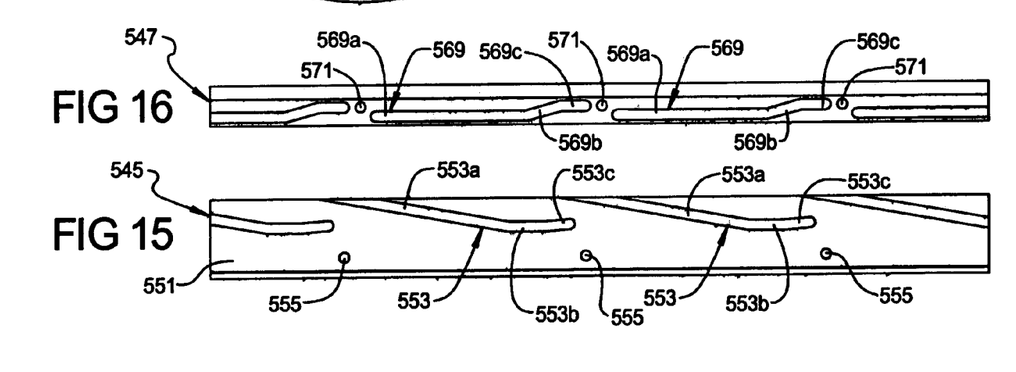
FIG. 15 is an unfolded view of an inner surface of the sleeve of FIG. 13.
FIG. 16 is an unfolded view of an outer surface of the release member of FIG. 14.

As shown in FIGS. 14 and 16, release member 547 includes a first outer cylindrical surface 567 having release grooves 569 for receiving first pins 557. Release member 547 also includes a number of second holes 571 that receive a second generally cylindrical pin 573 for connecting release member 547 to ratchet member 549. A leading edge 575 of release ring 547 is adapted to engage a locking member 577 during disconnection of first and second flanges 528, 536.

Referring again to FIGS. 11 and 12, ratchet member 549 provides support for release member 547 as release member 547 slides relative to ratchet ring 549. Ratchet member 549 includes a front serrated edge 579 and an inwardly extending portion 583 that rotates on stop 561. Ratchet member 549 also includes slots 585 adapted to receive second pins 573.

During connection of first and second flanges 528, 536, release assembly 537 is rotated on first flange 528 until tabs 543 on second flange 536 are aligned with and received in grooves 553 in sleeve 545. As sleeve 545 is rotated about first flange 528, such as in a clockwise direction, tabs 543 travel through a first portion 553a of sleeve grooves 553 drawing first flange 528 into second flange 536 through the camming action produced by the sleeve groove/tabs interface. Tabs 543 continue to travel through first angled portion 553a of sleeve grooves 553 until tabs 543 reach a dwell portion 553b of sleeve grooves 553. At dwell portion 553b, first flange 528 is fully connected to second flange 536. Sleeve 545 may continue to rotate about first flange 328 and second flange 536 through dwell portion 553b and into a second angled portion 553c of sleeve grooves 553. When tabs 543 reach an end of second angled portion 553c, tabs 543 are deemed to be in a locked position in sleeve grooves 553.

During connection of pipe joint 520 and while sleeve 545 rotates about tabs 543, first pins 557 are traveling through release grooves 569 in release ring 547. In an embodiment, grooves 569 include a first straight portion 569*a*, an angled portion 569*b*, and a second straight portion 569*c*. First pins 557 travel through release grooves 569 to position release member 547 in relation to locking member 577 depending on whether pipe joint 520 is being connected or disconnect. When pipe joint 520 is being connected, first pins 557 are generally located within first straight portion 569*a* of release groove 569. As sleeve 545 is rotated, first pins 557 travel through first straight portion 569*a*. When tabs 543 are traveling through dwell portion 553*b* of grooves 553, first pins 557 are traveling through angled portion 569*b*, causing release ring 547 to move axially away from locking member 577. This action ensures that leading edge 575 of release ring 547 does not engage locking member 577 when first flange 328 is connected to second flange 536. When tabs 543 are in the locked position in second angled portion 553*c* of grooves 553, first pins 557 are also in a locked position in second straight portion 569*c* of grooves 569.

As will be appreciated, first pins 557 may not always engage release grooves 569 in the same location. For example, when sleeve grooves 553 engage tabs 543, first pins 557 may be situated in release grooves 569 in second straight portion 569*c*. In this example, release ring 547 may rotate along with sleeve 545 prior to tabs 543 being received in grooves 553. The serrated front edge 579 of ratchet ring 549, by virtue of the ratchet ring's connection to release member 547 via second pins 573, will engage serrated rear edge 539 of first flange 528 and will permit ratchet member 549 and release member 547 to move with sleeve 545 until final engagement of tabs 543. The engagement of serrated edges 539, 579 permits ratchet member 549 to rotate in a first rotational direction (e.g. clockwise) and prevents rotation of ratchet member in a second rotational direction opposite the first rotational direction. Resilient biasing member 565 ensures pressure is applied to ratchet ring 549 by sleeve 545 to maintain engagement of serrated edges 539, 579.

Referring again to FIG. 11, when first flange 528 is connected to second flange 536, first flange 528 compresses a seal 591 against second flange 536 to prevent fluid leakage therebetween. Additionally, sleeve 545 may be adapted to sealingly engage second flange 536, preventing dust or contaminants from entering the area around locking member 577 and release assembly 537.

Figure 17:
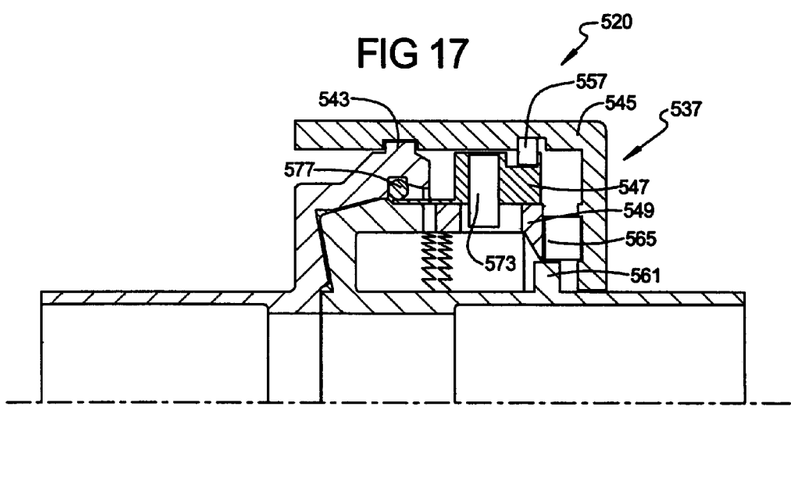
FIG. 17 is a cross-sectional view of the pipe joint of FIG. 11 shown during disconnection.

Referring to FIG. 17, when pipe joint 520 is disconnected, sleeve 545 is rotated in a direction opposite the direction of rotation during connection (e.g., counterclockwise) about second flange 536 and first flange 528. As sleeve 545 is rotated, tabs 543 travel through second angled portion 553*c* and into dwell portion 553*b*. Nearly simultaneously, first pins 557 travel through second straight portion 569*c* of release grooves 569 toward angled portion 569*b*. This action will force release member 547 to move axially forward and into contact with locking member 577.

Dwell portion 553*b* of sleeve grooves 553 permit sleeve 545 to maintain its axial location on first flange 328 while sleeve 545 is rotated about tabs 543 and release ring 547 is moved axially forward into contact with locking member 577. As first pins 557 continue to travel through first straight portion 569*c* of release grooves 569, leading edge 575 of release ring 547 forces locking member 577 to expand outward as described above. Even after locking member 577 is removed from its locked position, sleeve 545 continues to rotate until tabs 543 exit sleeve grooves 553 and first flange 528 is separated from second flange 536.

The embodiment shown in FIGS. 11-17 may be used in applications where manual connection of joint 520 is rendered difficult or impossible due to the relative incompressibility of sealing member 591. For example, in applications where seal 591 requires a relatively high compression force to seal, the camming action of release assembly 537 may be employed to draw first flange 528 into second flange 536 with a relatively small input force to rotate sleeve 545.

Figure 18:
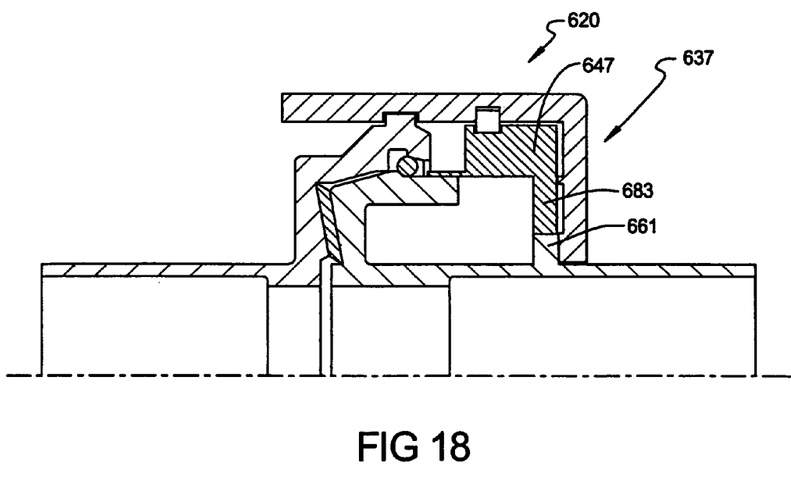
FIG. 18 is a cross-sectional view of a pipe joint according to another embodiment of the present invention.

Referring to FIG. 18, a pipe joint 620 according to another embodiment of the present invention is shown. The embodiment shown in FIG. 18 is substantially similar to the embodiment shown in FIG. 17 with at least one exception, namely, a sleeve assembly 637 does not contain a ratchet member or the second pins associated with the ratchet member. When so configured, a release ring 647 may include an extension 683 that extends radially inwardly to ride on a cylindrical stop 661 of first flange 628 and allows release ring 647 to be rotated and moved axially about cylindrical stop 661 rather than a ratchet ring. Operation of release assembly 637, sans the functionality associated with ratchet ring 549, is substantially similar to release assembly 637 described above.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A pipe joint, comprising:
   a first length of pipe including a first flange having a ramp extending outwardly and away from a leading exterior surface and a first locking surface extending inwardly and away from the ramp;
   a resiliently expandable locking member;
   a second length of pipe including a second flange having an interior portion sized to receive the first flange, the interior portion including a second locking surface and an inwardly facing annular groove adapted to receive the resiliently expandable locking member, the second locking surface positioned within the interior portion such that, upon insertion of the first flange into the second flange, the resiliently expandable locking member expands as it travels up the ramp and then contracts to become positioned between the first locking surface and the second locking surface to prevent withdrawal of the first flange from the second flange; and
   a sealing member positioned between the first and second flanges.

2. The pipe joint of claim 1, wherein the first flange includes a generally cylindrical surface that extends between the ramp and the first locking surface.

3. The pipe joint of claim 1, wherein the first locking surface includes a generally linear surface disposed at a first angle relative to an axis of the pipe joint and the second locking surface includes a generally linear surface disposed at a second angle relative to the axis of the pipe joint.

4. The pipe joint of claim 3, wherein the first angle is different than the second angle.

5. The pipe joint of claim 3, wherein the first and second angles converge in a direction toward the annular groove.

6. The pipe joint of claim 1, further including a release member that is movable relative to the first flange and positioned to selectively engage the locking member to facilitate expansion thereof.

7. The pipe joint of claim 6, wherein the release member includes a generally cylindrical wall that extends from a leading edge to a radially outwardly extending flange, and a slot or split that extends through release member from the leading edge through the cylindrical wall and the flange.

8. The pipe joint of claim 7, wherein the outwardly extending flange of the release member includes a radially inwardly extending portion that extends toward the first flange.

9. The pipe joint of claim 1, wherein the leading exterior surface of the first flange includes a first recess or groove and an interior surface of the second flange includes a second recess or groove that cooperates with the first recess or groove to contain the sealing member.

10. The pipe joint of claim 1, wherein the sealing member is positioned to be compressed axially.

11. The pipe joint of claim 1, wherein the sealing member is positioned to be compressed radially.

12. The pipe joint of claim 1, wherein the sealing member is one of an O-ring, a C-ring and an S-seal.

13. The pipe joint of claim 1, further including a release assembly having a sleeve with a sleeve groove adapted to receive a tab on the second flange, a release member having a release groove and a leading edge adapted to engage the locking member, and a first pin connected to the sleeve and positioned within the release groove to movably connect the sleeve to the release member.

14. The pipe joint of claim 13, wherein the release assembly further includes a ratchet member adapted to support the release member, a resilient biasing member adapted to bias the ratchet member into engagement with the first flange, and a second pin connected to the release member and positioned within a slot in the ratchet member to movably connect the release member to the ratchet member.

15. The pipe joint of claim 14, wherein the ratchet member includes a first edge and the first flange includes a second edge adapted to permit rotation of the ratchet member in a first rotational direction and to prevent rotation of the ratchet member in a second rotational direction opposite the first rotational direction.

16. A pipe joint, comprising:
a first length of pipe including a first flange having a radially extending leading surface, a ramp extending outwardly and away from the leading exterior surface, and a first locking surface;
a resiliently expandable locking member;
a second length of pipe including a second flange having an interior portion sized to receive the first flange, the interior portion including a second locking surface and an inwardly facing annular groove adapted to receive the resiliently expandable locking member, the second locking surface positioned within the interior portion such that, upon insertion of the first flange into the second flange, the resiliently expandable locking member expands as it travels up the ramp and then contracts to become positioned between the first locking surface and the second locking surface to prevent withdrawal of the first flange from the second flange; and
a sealing member positioned between the radially extending leading surface of the first flange and the second flange.

\* \* \* \* \*